Patented Sept. 28, 1926.

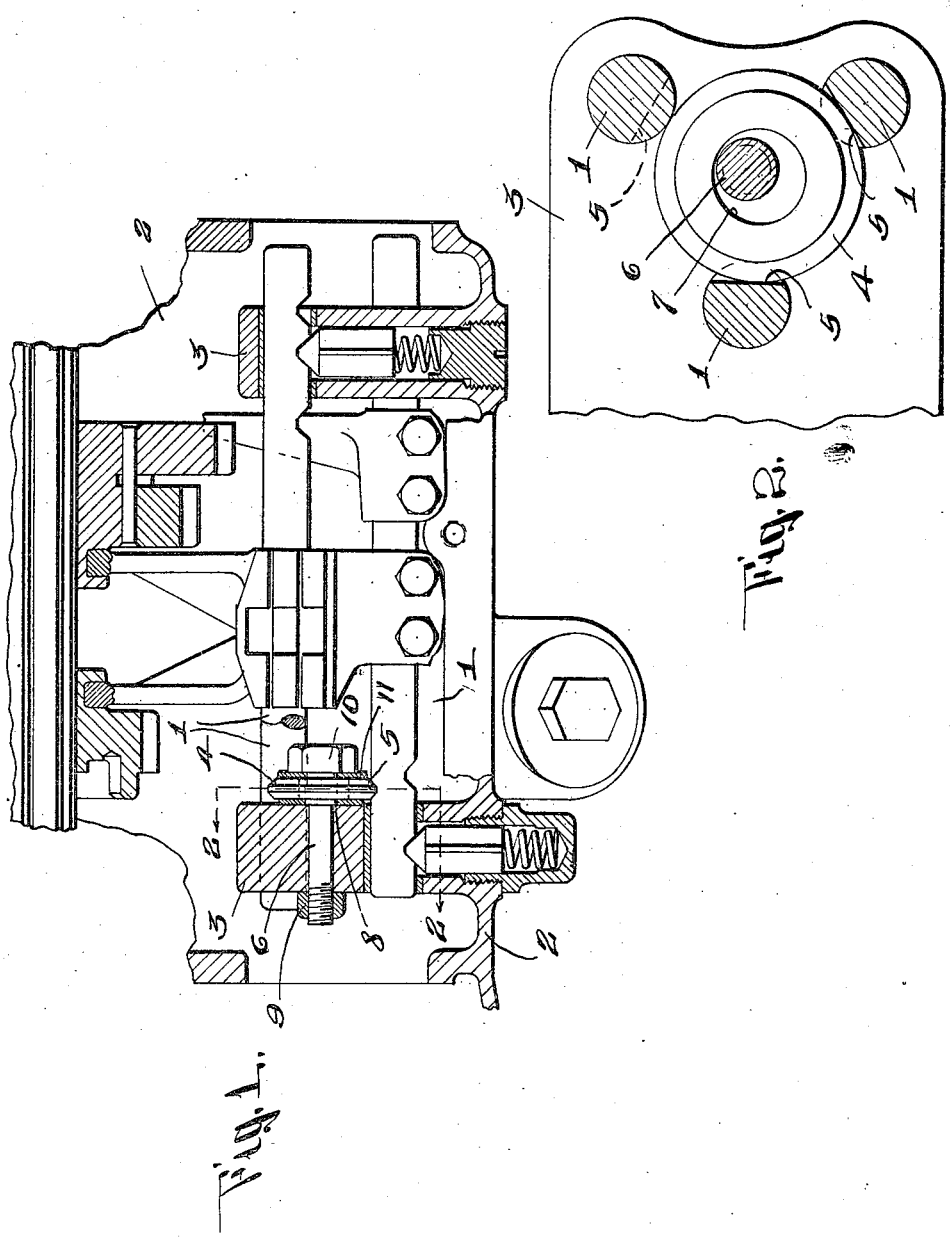

1,601,048

UNITED STATES PATENT OFFICE.

GEORGE W. SPONABLE, OF SYRACUSE, NEW YORK, ASSIGNOR TO THE BROWN-LIPE GEAR COMPANY, OF SYRACUSE, NEW YORK, A CORPORATION OF NEW YORK.

SHIFTING-ROD LOCK FOR TRANSMISSION GEARING.

Application filed January 26, 1926. Serial No. 83,848.

This invention relates to locking means for the shifting rods of change speed transmission gearing such as used in motor vehicles and has for its object a locking means which is particularly simple and economical in construction, composed of a few compactly arranged parts, is readily assembled in the gearing or the gear box, and is highly efficient and durable in use.

The invention consists in the novel features and in the combinations and constructions hereinafter set forth and claimed.

In describing this invention reference is had to the accompanying drawings in which like characters designate corresponding parts in all the views.

Figure 1 is a fragmentary sectional view of a gearing provided with my invention.

Figure 2 is a sectional view taken on line 2—2, Figure 1.

The numeral 1, designates the sliding shifting rods of a change speed gearing located within a suitable case or box 2. In the illustrated embodiment of my invention three of such rods are shown although two or any other plural number of rods may be used, in so far as my invention is concerned.

The rods which are arranged parallel to each other, are slidably mounted in walls of the case 2, and are here shown as slidable in internal walls or supports 3.

The construction of the gearing forms no part of this invention and further description thereof is thought to be unnecessary, it being sufficient to bear in mind that each rod 1 is shiftable from neutral position forwardly into one of its shifted positions and rearwardly into another. The rods are operated by well known selecting and shifting means.

4 designates the locking member which is operable by the shifting of any of the rods 1 from neutral position to lock the other rods from shifting movement and in neutral position, this locking means being shown as a member located between or among the rods 1 and coacting with the notches 5 in the rods 1. The notches are alined when all the rods are in neutral position. When any one of the rods is shifted out of neutral, it forces the locking member 4 into the notches of the other rod or rods and thus locks the unshifted rods from movement while one of the rods are being shifted, as movement of the locking member 4 out of the notches of the unshifted rods is prevented by the fact that the locking member rides on the periphery of the rod which is shifted out of neutral position.

This locking member 4 is here shown as a disk, as three rods are used. This invention relates to the supporting of the disk. The disk is here shown as mounted upon a spindle or a stud 6 carried by one of the supports for the rods, the disk 4 being located against such support and having an opening 7 of greater dimension or diameter than the portion of the stud 6 on which the disk is mounted so that the disk is free to shift laterally out of the notch 5 of the shifted rod into the notches 5 of the unshifted rods.

The periphery of the disk 4 is beveled and also the walls of the notches 5 are beveled so that the sliding movement of any one of the rods wedges or cams the disk 4 laterally into the notches 5 of the other rod.

The stud 6 is here shown as a bolt extending through one of the supports 3, and having an annular shoulder 8 formed by an enlarged portion of a bolt, which shoulder 8 thrusts against one face of the support, it being held against such face by a nut 9 threading on the bolt. The annular shoulder and the nut hold the bolt from endwise movement.

The disk 4 is mounted on the enlarged portion of the bolt, and is held from movement axially of the bolt by the head 10 of the bolt or a washer 11 interposed between the head and the disk.

This locking means is a self-contained structure and consists of but three parts, a bolt, a nut and a disk, and therefore is readily assembled in a gear case either on an internal support or on any other of the walls of the gear casing or box.

What I claim is:—

1. The combination of a plurality of axially slidable shifting rods, a wall formed with openings in which the rods are slidable, and means operated by either rod for locking the other rod from movement comprising a locking member arranged adjacent said wall, and formed with an opening, a stud mounted in the wall and extending through the opening, the opening being larger than the stud whereby the locking member is shiftable on the stud, the stud having a head thereon for holding the locking member from displacement.

2. The combination of a plurality of axially slidably shifting rods, a wall formed with openings in which the rods are slidable, and means operated by either rod for locking the other rod from movement comprising a locking member arranged adjacent said wall, a bolt extending into the wall and having a shoulder thrusting against said wall, the locking member being mounted on the bolt adjacent the shoulder and having an opening of larger diameter than the bolt whereby the locking member is shiftable laterally on the bolt, a head on the bolt opposed to the locking member.

3. The combination of a plurality of axially slidable shifting rods and a wall in which the rods are slidable, means operated by one of the rods when being shifted to lock the other rod from shifting movement, said means comprising a laterally shiftable member arranged between the rods, the rods being formed with notches for receiving the margin of said member, the diameter of said member being substantially equal to the distance between the rods plus the depth of one of the notches, the locking member having a central opening and a pin on which the locking member is mounted, the pin extending through the opening and the opening being of greater dimension than the diameter of the pin in order to permit lateral shifting of the locking member.

4. The combination of claim 3 in which the locking member is a disk having its axial opening of larger diameter than the pin on which the disk is mounted.

5. The combination of a casing, axially movable shifting rods in the casing, supports for the rods having openings in which the rods are slidable, the rods being formed with notches arranged in alinement when all the rods are in one position, means operated by any one of the rods when being shifted, for locking the other rods from movement, comprising a discoidal locking member arranged between the rods and being of a diameter equal to the distance of the notches, a pin supporting the disk between any two of the rods plus the depth, the pin extending into one of said supports for the rods and the disk being arranged to abut against the support and having an opening of greater diameter than the pin for receiving the pin whereby the disk is movable laterally and a head on the pin opposed to the outer face of the disk.

In testimony whereof, I have hereunto signed my name, at Syracuse, in the county of Onondaga, and State of New York, this 22nd day of Jan., 1926.

GEORGE W. SPONABLE.